(12) United States Patent
Smith

(10) Patent No.: US 11,078,091 B2
(45) Date of Patent: Aug. 3, 2021

(54) SYSTEM AND METHOD FOR USING AC AND DC SENSORS FOR WATER TREATMENT

(71) Applicant: Griswold Water Systems, Inc., New Smyrna Beach, FL (US)

(72) Inventor: Andrew L. Smith, Fort Myers, FL (US)

(73) Assignee: General Water Systems LLC, Carona (CA)

( * ) Notice: Subject to any disclaimer, the term of this patent is extended or adjusted under 35 U.S.C. 154(b) by 72 days.

(21) Appl. No.: 16/259,298

(22) Filed: Jan. 28, 2019

(65) Prior Publication Data

US 2019/0152803 A1    May 23, 2019

Related U.S. Application Data

(60) Continuation of application No. 14/987,686, filed on Jan. 4, 2016, now Pat. No. 10,189,721, which is a division of application No. 13/180,451, filed on Jul. 11, 2011, now Pat. No. 9,227,859, which is a continuation-in-part of application No. 12/073,537, filed on Mar. 6, 2008, now Pat. No. 7,977,933.

(51) Int. Cl.
*C02F 1/00* (2006.01)
*C02F 1/48* (2006.01)

(52) U.S. Cl.
CPC .............. *C02F 1/008* (2013.01); *C02F 1/005* (2013.01); *C02F 1/484* (2013.01); *C02F 2201/483* (2013.01); *C02F 2209/005* (2013.01); *C02F 2209/006* (2013.01); *C02F 2209/008* (2013.01); *C02F 2209/11* (2013.01); *C02F 2303/22* (2013.01)

(58) Field of Classification Search
CPC ........... C02F 1/005; C02F 1/008; C02F 1/484
See application file for complete search history.

(56) References Cited

U.S. PATENT DOCUMENTS

| | | |
|---|---|---|
| 3,880,226 A | 4/1975 | Houser |
| 5,032,839 A | 7/1991 | Even-Or |
| 5,171,228 A | 12/1992 | McDonald |

(Continued)

OTHER PUBLICATIONS

Griswold Filtration; SBC Control—Scale, Bacteria & Corrosion Control—Consider the Benefits; Apr. 2004; 4 pp.; Corona, CA.

(Continued)

*Primary Examiner* — Paresh Patel
(74) *Attorney, Agent, or Firm* — Aldo Noto; Davidson Berquist Jackson & Gowdey, LLP

(57) ABSTRACT

A system and method are disclosed for automatically operating a high voltage resonance circuit. An embodiment of the system includes one or more coils each coil can be an alternating current (AC) coil or a direct current (DC) coil. An embodiment of the system further includes a microprocessor that issues commands to control amplitude and frequency of pulses of the one or more coils to reach and maintain a resonant condition for water treatment. The microprocessor determines whether a coil is an AC coil or a DC coil by detecting whether a capacitor is connected in series with the coil. An embodiment of the system further includes one or more sensors that measure the quality of water and provide feedback to the microprocessor.

3 Claims, 14 Drawing Sheets

(56) References Cited

U.S. PATENT DOCUMENTS

| | | |
|---|---|---|
| 5,988,348 A | 11/1999 | Martin |
| 6,084,682 A | 7/2000 | Zare |
| 7,038,470 B1 | 5/2006 | Johnson |
| 7,524,413 B2 * | 4/2009 | Wittmer .................. C02F 1/484 |
| | | 204/660 |
| 7,524,424 B2 | 4/2009 | Wittmer |
| 7,704,364 B2 | 4/2010 | Merrill |
| 7,981,288 B2 | 7/2011 | Bradley |
| 7,997,933 B2 | 8/2011 | Feldman et al. |
| 2003/0001579 A1 | 1/2003 | Kuennen |
| 2004/0082884 A1 | 4/2004 | Pal |
| 2007/0114164 A1 | 5/2007 | Bradley |

OTHER PUBLICATIONS

Griswold Filtration; SBC Control—Scale, Bacteria & Corrosion Control-Electronic Precipitator System, Mar. 31, 2004; 21 pp.
Griswold Filtration; SBC Installation/Operational Manual-Model SBC-10, 10,000 INT, Sch. 80 PVC-RC; 2004; 6 pp.
Griswold Filtration; SBC Reaction Chamber Specification; SBC Drive with Internal User Interface, Apr. 2004; 1 page.

* cited by examiner

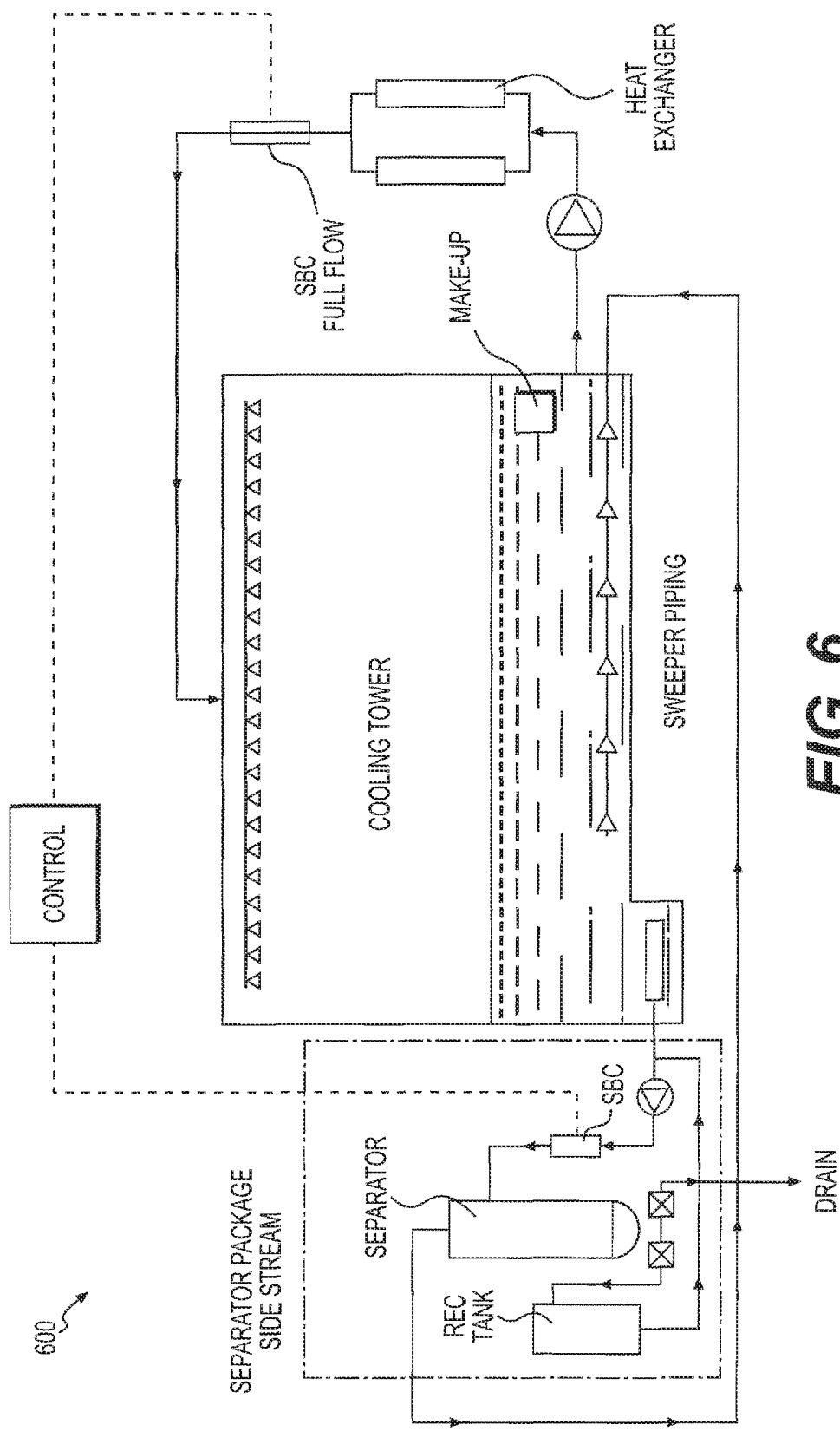

EXEMPLARY
FIRING SEQUENCES

SYSTEM AND METHOD FOR USING AC AND DC SENSORS FOR WATER TREATMENT

RELATED APPLICATION

This application is a continuation-in-part application of U.S. patent application Ser. No. 12/073,537, entitled "High Voltage Sensor Circuit," filed on Mar. 6, 2008, the content of which is incorporated herein by reference in its entirety.

TECHNICAL FIELD(S)

The technical field is water treatment using high voltage sensor circuits.

BACKGROUND

Many freshwater applications suffer degraded performance due to buildup of scale, bacteria and corrosion. Current water treatment systems focus on use of often harsh chemicals to limit the effects of this buildup. In addition, use of chemicals is time consuming and expensive. Chemicals must be added frequently, water chemistry monitored through frequent sampling and analysis, and periodic flushing, shocking and similar operations still are required. Even with the most sophisticated chemical treatment system, some scale buildup will occur, particularly in high temperature components such as heat exchangers and steam generators. Table 1 shows the impact of scale buildup on performance of a heat exchanger.

TABLE 1

Increase in Energy Consumption as a Function of Scale Thickness

| Scale Thickness (Inches) | Increased Energy Consumption (%) |
|---|---|
| 1/32 | 8.5 |
| 1/16 | 12.4 |
| 1/8 | 25 |
| 1/4 | 40 |

Many devices currently available use one or more solenoid coils to prevent scale and bacteria growth in water that passes through the coils. Some current devices use microprocessors to generate the waveform used to adjust pulse frequency. However, most current devices use standard analog techniques to provide signals to their coils, which do not have the flexibility to change the use of any coil between AC and DC signals or to allow different settings of signal amplitude adjustment for different waters or operating conditions.

One such device is the Dolphin, manufactured by Clearwater Systems, Inc. (U.S. Pat. No. 7,524,424) this device uses a microprocessor to pack more pulses into a given half cycle, but there is no user interface or other provisions for modification of signal output to account for varying water conditions. In addition although it has more than one coil, they are operated in series so behave electrically as a single unit and there is no provision for different signals to different coils.

Another such device is the Pulse-Pure manufactured by Evapco (US Patent Application 2007/0114164). Whereas this device does have provisions for AC and DC coils, there is no flexibility to allow changing signals in the field if the conditions warrant. In addition, the resonant frequency must be determined at the factory and adjusted with trimmer capacitors. There is no provision for automatic tuning of the circuit or any adjustments an operator could make in the field to alter treatment characteristics to compensate for differences in water quality or character.

SUMMARY

An embodiment of a system for automatically operating a high voltage sensor circuit includes one or more coils, each coil can be an alternating current (AC) coil or a direct current (DC) coil, and a microprocessor that issues commands to control frequency of pulses of the one or more coils to reach and maintain an approximate resonant frequency of the pulses for water treatment. The microprocessor determines whether a coil is an AC coil or a DC coil by detecting whether a capacitor is connected in series with the coil. The system further includes one or more sensors that measure the quality of water and provide feedback to the microprocessor.

An embodiment of a method for automatically operating a high voltage resonance circuit includes initiating the high voltage resonance circuit, reading an alternating current (AC) threshold and a minimum direct current (DC) current from a memory, determining whether a coil is an AC coil or a DC coil by detecting whether a capacitor is connected in series with the coil; issuing commands to control frequency of pulses of the one or more coils to approximately reach and maintain a resonant frequency of the pulses for water treatment, and using one or more sensors to measure the quality of water and provide feedback to the microprocessor. An embodiment of a non-transitory computer readable medium provides instructions for automatically operating a high voltage resonance circuit. The instructions include initiating the high voltage resonance circuit, reading an alternating current (AC) threshold and a minimum direct current (DC) current from a memory, determining whether a coil is an AC coil or a DC coil by detecting whether a capacitor is connected in series with the coil, issuing commands to control frequency of pulses of the one or more coils to approximately reach and maintain a resonant frequency of the pulses for water treatment, and using one or more sensors to measure the quality of water and provide feedback to the microprocessor.

DESCRIPTION OF THE DRAWINGS

The detailed Description will refer to the following drawings in which like numerals refer to like items, and in which:

FIG. 6 is a schematic of a heat exchanger system incorporating a scale bacteria and corrosion controller with the high voltage sensor circuit of FIG. 1;

FIG. 11 illustrates two exemplary firing sequences;

DETAILED DESCRIPTION

Figure 1:
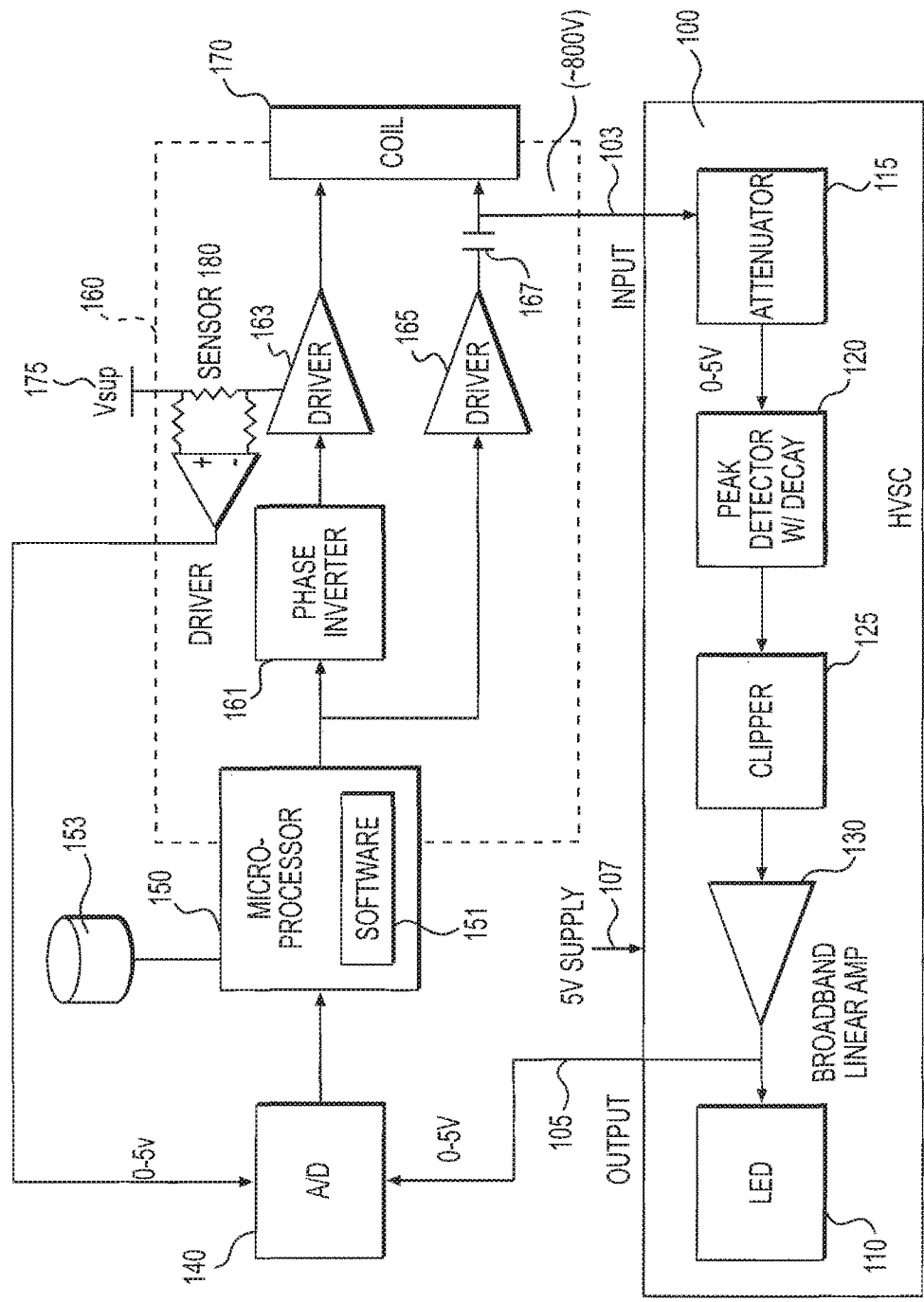
FIG. 1 is a block diagram of components of an exemplary system for automatically operating a high voltage resonance circuit, which includes a high voltage sensor circuit, a DC sensor circuit, and associated microprocessor and coil drive circuit.

In any freshwater system, scale and bacteria from the interaction of the freshwater and its system components can cause degraded performance and other problems. To prevent or minimize the buildup of these unwanted products and particles, a resonant water treatment system incorporating electronic precipitation and optional filtration is disclosed. This system uses a special purpose controller that applies a complex electronic signal to the water by way of an induction coil. Using this electronic precipitation system, problems inherent in chemical treatment systems are avoided. However, for such a resonant system, maintaining resonance and appropriate DC power levels is necessary for optimal system performance.

A Scale and Bacteria Controller (SBC) generates the complex electronic signal that is applied to the water by way of the induction coil. The induction coil is housed, for example, in a PVC or Fiberglass reaction chamber. As water passes through the reaction chamber, the shape, size and net charge of the dissolved mineral crystals are altered. In this altered state, calcium and other hard water minerals do not precipitate in the normal fashion and adhere to system surfaces. The signal produced by the SBC provides nucleation sites or seed crystals in the bulk water that force minerals to grow free floating crystal masses instead of coating surfaces with adherent scale. The same signals are also responsible for reducing surface charges on suspended particulates, including bacteria, thereby allowing formation of larger aggregate masses that can be removed by filtration, blowdown or settling. In addition, the increased surface energy present due to the production of increased nucleation sites results in a natural decrease in water surface tension and greater solubility. The improved solubility of the treated water allows existing mineral encrustations to gradually re-hydrate and soften sufficiently to be removed by water flow, restoring heat exchanger efficiency without harsh chemical treatments.

The SBC controls bacteria in three ways. First, many organisms will bind up in colloidal mineral particles and be removed by filtration, blowdown or settling. Second, the SBC signal has sufficient power to damage bacteria cell walls by electroporation, thereby rendering the bacteria incapable of reproduction. Third, some of the dissolved gasses in the water can be activated by the energy imparted by the coil in such fashion as to form various peroxides, free radicals and other reactive species that are generally harmful to bacteria. Microbial populations are controlled with this system to well below industry standards The maximum energy transfer of oscillating energy between two mediums occurs at resonant frequencies of one medium or the other or of both mediums. Sustaining a resonant frequency over time provides the maximum transfer of energy over time. However, the physical properties that make the transfer practical can be subject to direct and indirect variations compromising optimal energy transfer. For example, temperature can cause expansion, which changes the frequency of resonance of one medium or the other, and under a fixed frequency system, energy transfer can be compromised. Furthermore, operating frequencies can vary due to component properties such as linear ranges and thermal sensitivities, also compromising energy transfer. For maximum power transfer in a resonant system, it is important to assess the natural resonance of the medium(s) and sustain operation at resonance over time. To account for these affects, a self-tuning resonant circuit is disclosed to reach and maintain a resonant condition, which may be approximately +/−10% of the resonant frequency. Fine tuning is possible for maximum power, and off-tuning is possible to reduce output power. The circuit is controlled so that an optimum resonant frequency is developed, where the optimum frequency corresponds to a peak power generation in the induction coil. The power output of the induction coil then is monitored to ensure the peak power condition is maintained, or if the peak power degrades, action can be taken to restore optimum operation.

An embodiment of a water treatment system for automatically operating a high voltage sensor circuit provides for the generation of microprocessor controlled varying electromagnetic fields about at least one of several coils through which water flows. The coils can be an alternating current (AC) coil or a direct current (DC) coil. An AC coil is dedicated to AC signals due to the use of a series capacitor. An DC coil is driven without a series capacitor so that current pulses can be applied to the DC coil. An exemplary embodiment of the system includes a microprocessor and a driver per coil. The microprocessor issues commands to control AC and DC signal timing and to generate a user interface. The signal timing may be done through additional driver processors, or directly through control and interface logic, as the exemplary embodiment shows. Each coil receives appropriate signals, whether AC or DC, according to the execution of the software by the microprocessor and whether the coils were detected to be oriented for AC or DC.

Although variations are possible, for this system, an initial Scanning Phase under control of a microprocessor may determine the mean frequency, about which any of the electromagnetic fields vary. The same micro processor may be used to excite the coils through driver processors, and each coil is connected to a high voltage sensor circuit (HVSC) and DC current sensor circuit. During this Scanning Phase, the HVSC is used to detect resonance and determine its frequency for coils oriented for AC. The HVSC also is used to detect energy transfer, during a second, or Normal Run Phase, of the microprocessor to enhance the function of the water treatment device for AC coils and apply and measure DC current pulses for DC coils. The microprocessor can alternate between the Scanning and Normal Run phases and can also incorporate both phases into a single algorithm. Other methods processing the phases may be used including multiple processors. For example, the method can be implemented with a single microprocessor and separate driver processors for each load coil.

The microprocessor produces signals that are amplified and used to control varying currents passing through coils through which water flows. The amplification may be modulated. During the Normal Run Phase, the frequencies determined during the Scanning Phase are sustained as mean frequencies. For some coils, the mean frequency may be preset in hardware and/or software; for other coils the mean frequency may be determined from values read from an A/D converter in conjunction with the HVSC, the microprocessor (s), and the microprocessor associated software. These mean frequencies are related to the resonant frequencies of the AC coils being monitored. The same HVSC, microprocessor and the microprocessor's associated software may be used during the Normal Run Phase as a means of checking the performance of the coil. During this latter phase, the HVSC and DC sensors are used as energy level detectors.

An embodiment of the system provides a user interface to supply diagnostic capabilities as well as the ability to make signal amplitude and timing changes in the field for special occasions. For example, a user can make adjustments to the amplitude and frequency (i.e., duration and pulse timing) of pulses driving an AC coil as well as power levels delivered to DC coils.

An embodiment of the system provides a built-in audible alarm and alpha numeric display to provide system diagnostic information.

An embodiment of the system provides a USB port to allow for change of system programming as needed for recent product advancements and to allow for special water treatment circumstances.

FIG. 1 is a diagram of an embodiment of a system for automatically operating a high voltage resonance circuit, which includes a HVSC 100 and associated microprocessor 150, memory 153, and drive circuit 160 (including driver processor 169) for use in the SBC. The HVSC 100 has a single point common ground 101, a signal input 103 for signal voltages up to over one thousand volts DC as well as AC, a signal output 105, for up to 5 VDC, a 5 VDC voltage supply 107, and a proportional optical output in the form of a high efficiency LED 110. The signal input 103 is such that the signal input 103 may be wired directly to a high voltage node of the SBC, which is usually a terminal to a coil being monitored, while at the same time resisting damage due to high voltage. The signal output 105 is such that the signal output 105 may be wired directly to a 5V A/D converter 140, which is accessed directly by the 5 VDC microprocessor 150. The transfer function of the HVSC 100 is such that the output 105 is linear and proportional to the input 103 up to a limit, at which point the output 105 remains at a terminal value as the input 103 voltage continues to increase within a broad frequency range that includes DC. The relative brightness of the LED 110 reflects the signal output linearly and also remains at a high brightness as the signal input 103 voltage meets and exceeds a certain limit, such as, for example, 1000 VDC. The transfer function also incorporates a peak level detector and storage device with decay to assure that the input signal duty cycle will have little impact on the output signal when the input is above a threshold frequency determined by the decay rate of the peak detector, for example, 1000 Hz. The bandwidth of the HVSC 100 is sufficient for high frequency water treatment. For example, upper frequency operation of at least 80,000 Hz has been tested, and will allow for the detection and transfer of peak values independent of duty cycle within the frequency range of the two limits (1000 Hz and 80,000 Hz), but also including DC. The output 105 of the HVSC 100 normally is wired to the A/D converter 140, which can be monitored directly by the microprocessor 150. FIG. 1 also shows the current supplied to the output driver by the driver supply voltage (Vsup) 175 being monitored by the voltage measured across a current-sense resistor also being fed to an A/D converter input for the purpose of the microprocessor 150 being able to measure the current supplied to the coil 170, whether AC or DC.

Figure 2:
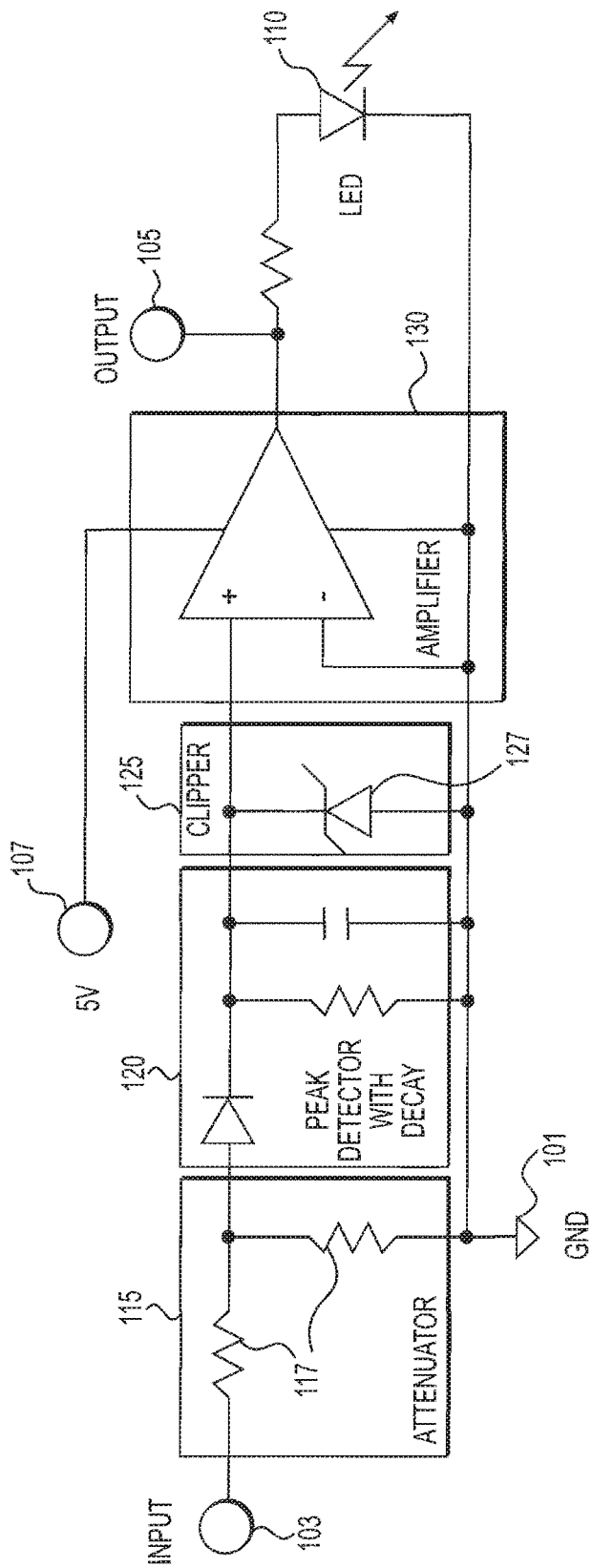
FIG. 2 is a simplified electrical schematic diagram of the exemplary high voltage sensor circuit of FIG. 1.

FIG. 2 is a simplified electrical schematic of the HVSC 100.

Referring to FIGS. 1 and 2, attenuator 115 is capable of receiving hundreds and thousands of volts without breaking down or signal corruption. This is achieved by using high performance resistors 117 in a voltage divider network while accounting for device power dissipation requirements under the stress of applied high voltages. The transfer curve of the attenuator 115 is linear over its working input voltage range, up to thousands of volts, and may divide the input signal by a factor, such as 1000.

Peak detector 120 holds a peak input voltage output from the attenuator 115 for a predetermined amount of time, such as 1 ms, for example. The decay allows the peak detector 120 to recover after the decay time so that lower peak voltage values may be detected within the signal stream. The peak detector 120 also may be a signal envelope detector where the amplitude modulation of a carrier signal is passed and the carrier signal itself is filtered away. The peak detector 120 delivers an output proportional to the envelope magnitude of the incoming signal, provided that its carrier frequency is above the inverse of the decay time (1 ms translates to 1000 Hz). The peak detector 120 also is passive so that the peak detector 120 can withstand excessive input voltages passed by the attenuator 115 without breaking down.

Clipper 125 prevents signals passing through the attenuator 115 and peak detector 120 from reaching the active and sensitive electronics of linear amplifier 130. The clipping action may be accomplished via a non-linear device, such as a diode. In an embodiment, the clipper 125 uses a Zener diode 127.

The broadband linear amplifier 130 provides a signal strong enough to excite the LED 110. The output 105 of the amplifier 130 is also a convenient place from which the A/D converter 140 may be driven without the need for further signal conditioning if the voltage levels of the amplifier 130 and the A/D converter 140 are compatible.

The LED 110, if generating visible light, is a convenient visual indicator to a user that the coil of interest is efficiently transferring electromagnetic energy to the water within its proximity (such as passing through it). The LED 110 also may be part of a semiconductor opto-isolator device (not shown) used to convey the coil status to further electronic equipment, such as a remote status indicator, alarm system, or a performance assessor, for example.

Also shown in FIG. 1 is microprocessor-based coil excitation and drive circuit 160. The circuit 160 includes phase inverter 161, which takes a square wave signal out of the microprocessor 150 and inverts the signal. Drivers 163 and 165 then apply the square wave signals to coil 170. In the case of a coil configured for AC, voltage from driver 165 is first applied to capacitor 167. The application of the voltage signals to the capacitor 167 and the coil 170 generate an oscillating energy system where voltage builds to a peak power indicative of resonance in the coil 170 and the capacitor 167. In an embodiment, peak voltage can reach 800 volts or more. If the coil is a DC coil, the capacitor 167 is replaced by a shunt (also referred to as a jumper, not shown).

Although the exemplary embodiment of FIG. 1 shows only one coil 170, additional coils can be used with the water treatment system, and each coil could have its own driver processor (not shown). In one embodiment in which additional coils are added, each such coil would have its own associated HVSC, A/D converter, and driver circuit, and if a coil can be configured for DC, it would also have a DC sensor 180. Various configurations of coils and coil supporting hardware and software may be used to perform the functions described.

For coils such as coil 170, to ensure resonance and energy efficiency, the microprocessor 150 is programmed with specially designed software 151 that implements at least two modes or phases, namely the Scanning Phase and the Normal Run Phase. The Scanning Phase is used to drive the coil 170 with a series of frequencies over a broad spectrum while monitoring the A/D converter 140 to identify which frequency yields the greatest energy transfer as indicated by the highest voltage recorded during this frequency scan. The Normal Run Phase is used to drive the coil 170 at a frequency determined by the Scanning Phase while monitoring the magnitude of the A/D converter 140 to either adjust the frequency to regain a peak value or make assessments regarding the efficiency of energy transfer for the software 151 to handle accordingly, such as to auto-reset or indicate a warning, should energy transfer decrease significantly. The software 151 may incorporate the Scanning Phase once and sustain operation during the Normal Run Phase, or the Scanning Phase may be integrated into the Normal Run Phase or regular or integrated re-scanning and auto-adjusting.

As an alternative to software, the scanning and normal run functions may be implemented in a hardware device, or a combination of software and hardware.

Figure 3:
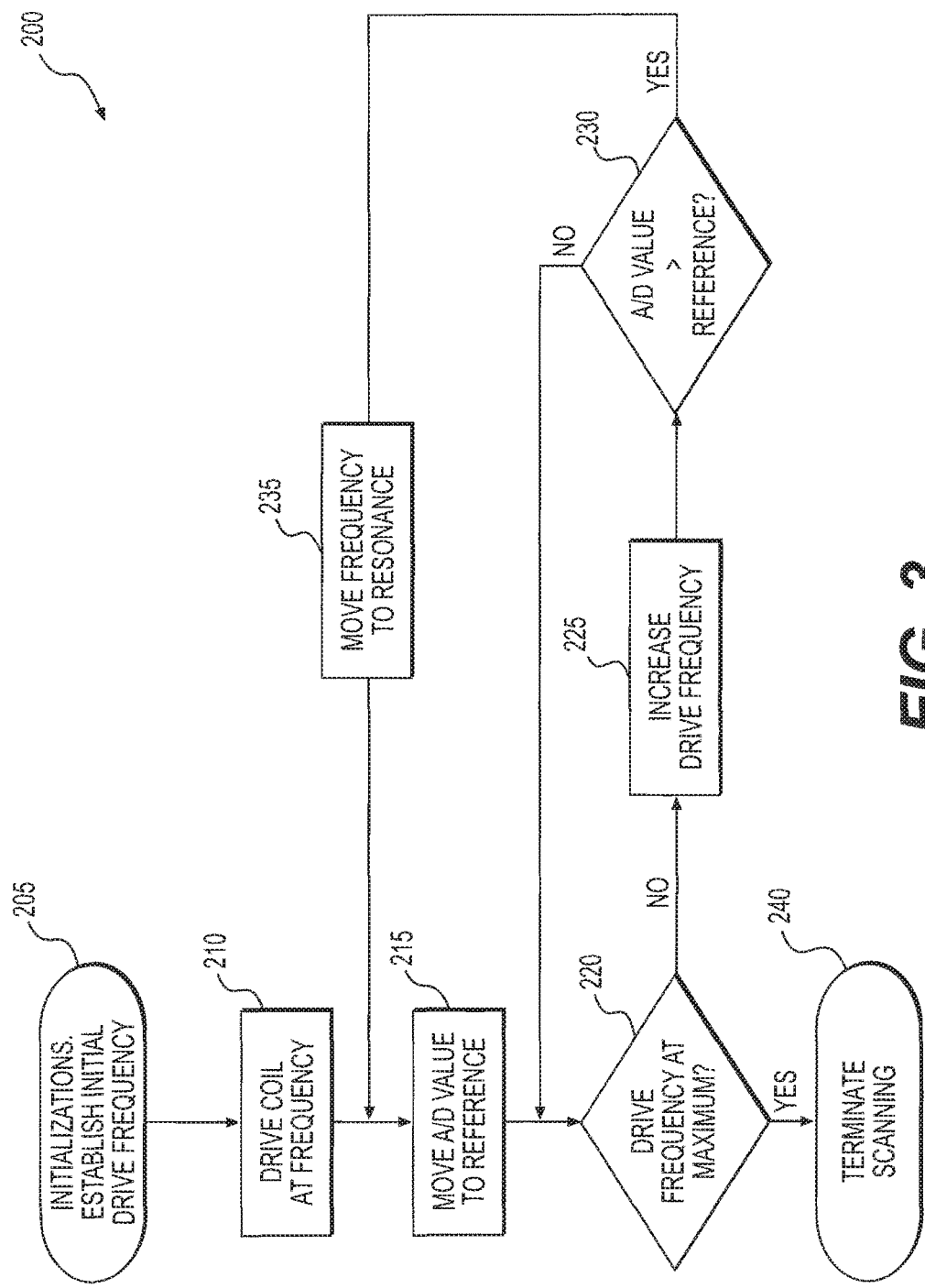
FIG. 3 is a flowchart illustrating an exemplary scanning phase operation of an exemplary method for automatically operating a high voltage resonance circuit.

FIG. 3 is a flowchart illustrating an exemplary Scanning Phase routine 200 of an exemplary method for automatically operating a high voltage resonance circuit performed under control of a microprocessor 150 as shown in FIG. 1. The routine 200 begins, block 205, with basic initializations, such as clearing the prior values stored as the resonance frequency and the reference A/D converter value, and setting an initial coil drive frequency, such as 100 Hz, for example. In block 210, the initial coil drive frequency is applied to the coil 170. In blocks 215 through 235, for this initial coil drive frequency, and for subsequent frequencies, a corresponding A/D value is obtained by a microprocessor 150 through the HVSC 100. The A/D value then is stored in the memory 153 as a Reference value or compared to the Reference value and stored there if greater. Likewise, when a new A/D value is stored as the Reference value, the corresponding frequency also is stored separately. At the end of the Scanning Phase routine 200, when scanning terminates, block 240, the stored frequency is that which is closest to peak of the natural resonance of the coil 170. This frequency is then used as the mean operating frequency for the Normal Run Phase by a microprocessor 150.

Figure 4A:
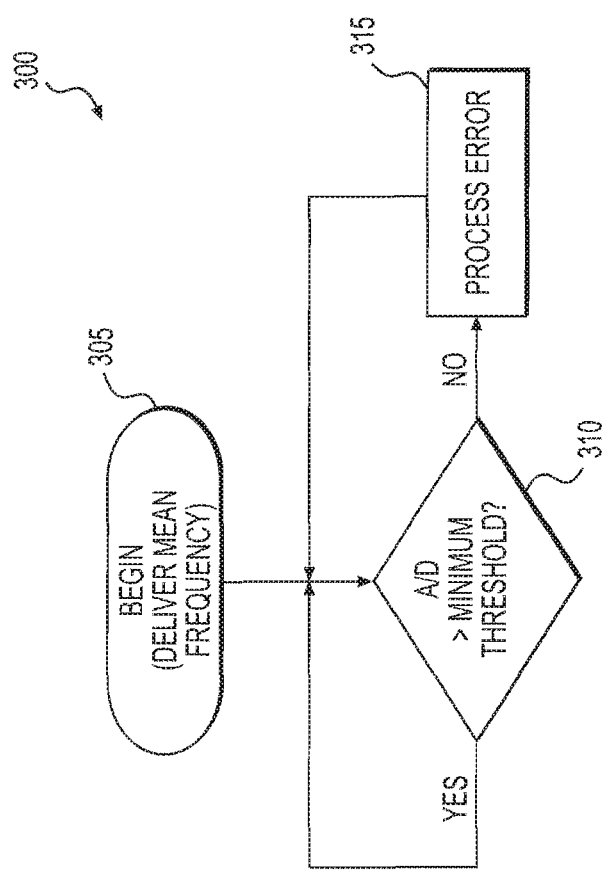
FIG. 4A is a flowchart illustrating an exemplary normal run phase operation of the exemplary method for automatically operating a high voltage resonance circuit.

FIG. 4A is a flowchart illustrating an exemplary AC Portion of a Normal Run routine 300 of the exemplary method for automatically operating a high voltage resonance circuit executed by the microprocessor 150 of FIG. 1. In block 305 the microprocessor 150 sends a signal to the driver or optional driver processor (not shown) of the coil drive circuit 160 to generate a fixed frequency as determined during the Scanning routine 200. The output power of the A/D converter 140 is monitored by the HVSC 100, and if detected to drop below a threshold value (also referred to as AC threshold, which is the minimum AC voltage that needs to be detected to identify a frequency as resonant) (block 310), an error event is declared, block 315, which may be communicated to a human operator (locally or remotely), terminating power, and recording the event, for example.

Figure 4B:
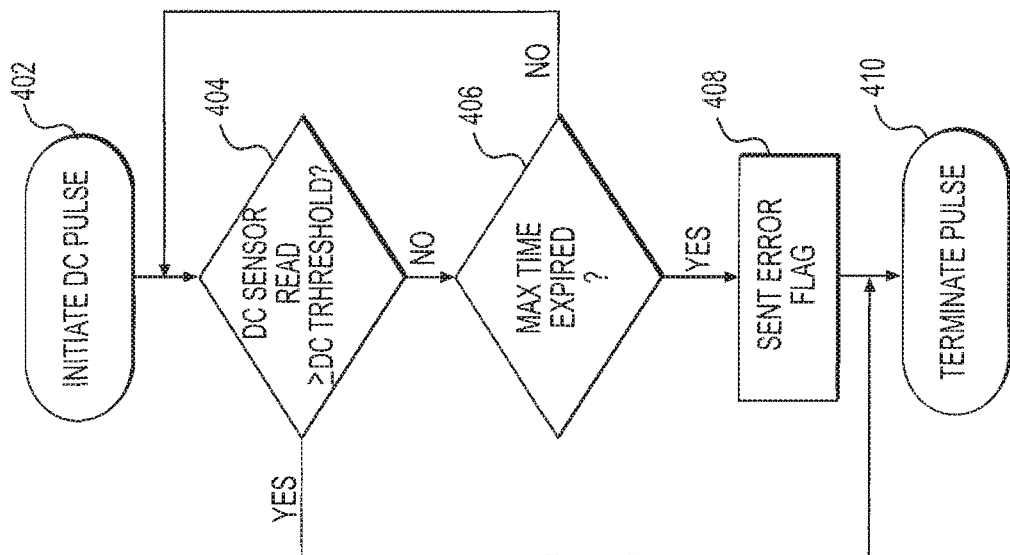
FIG. 4B is a flowchart illustrating the DC portion of the normal run phase operation that is executed for each coil configured without a series capacitor.

FIG. 4B is a flowchart illustrating the DC portion of the Normal Run routine which is executed for each coil configured without a series capacitor. During initiation (block 402), current is applied to the coil and an internal timer is cleared. In a loop, the microprocessor 150 reads the current applied using the A/D converter 140. If the timer hits a limit parameter or if the current is sensed to be at or above the DC level threshold parameter (block 404), the application of DC current is terminated, terminating the DC pulse for that coil (block 410). In the case that the current was not sensed to meet the minimum required level (block 404) and the maximum time has expired (block 406), a flag may be set to allow for the processing of the error, such as using an alarm or other action (block 408).

Figure 5:
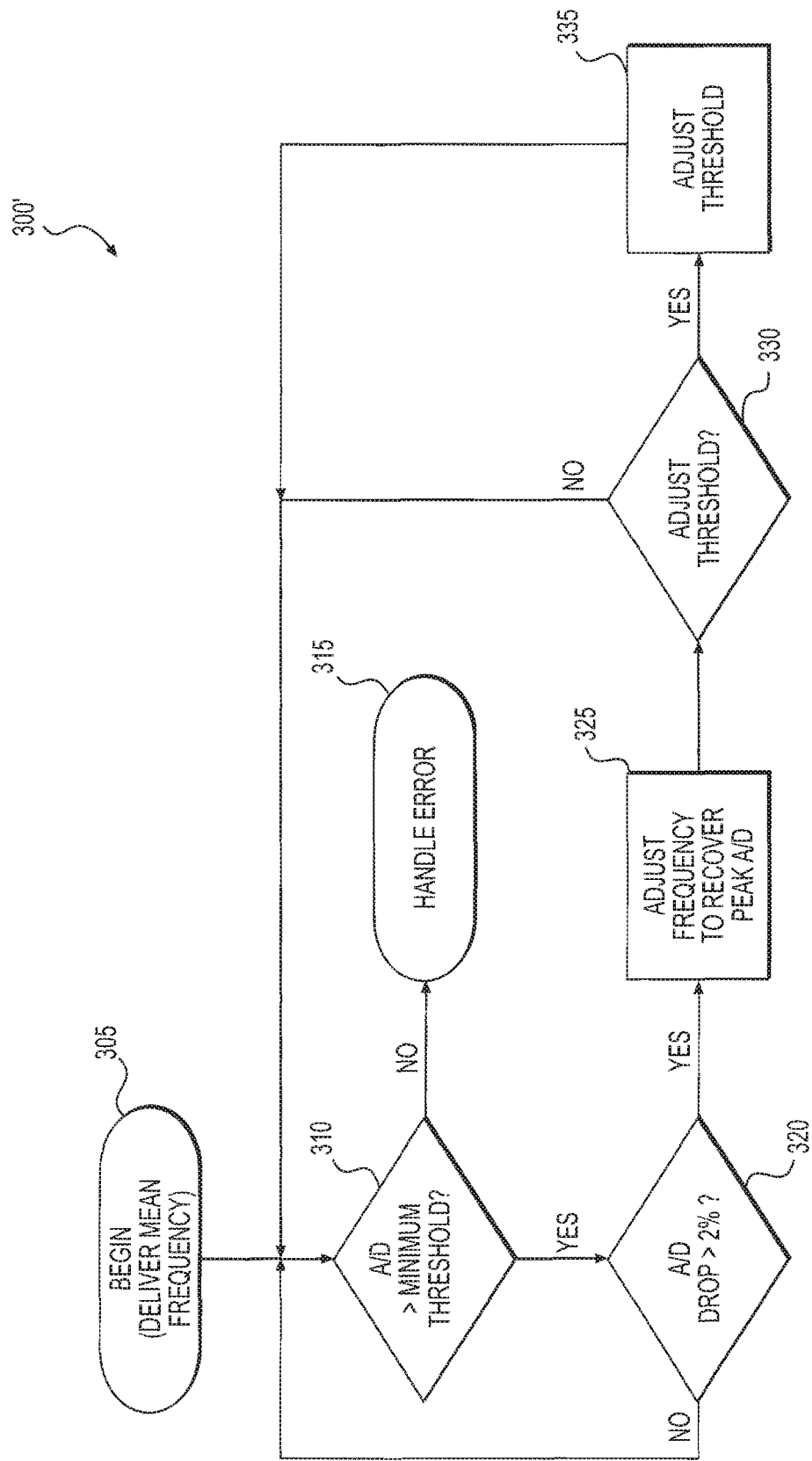
FIG. 5 is a flowchart illustrating an alternative normal run phase operation of the exemplary method for automatically operating a high voltage resonance circuit.
Figure 7A:
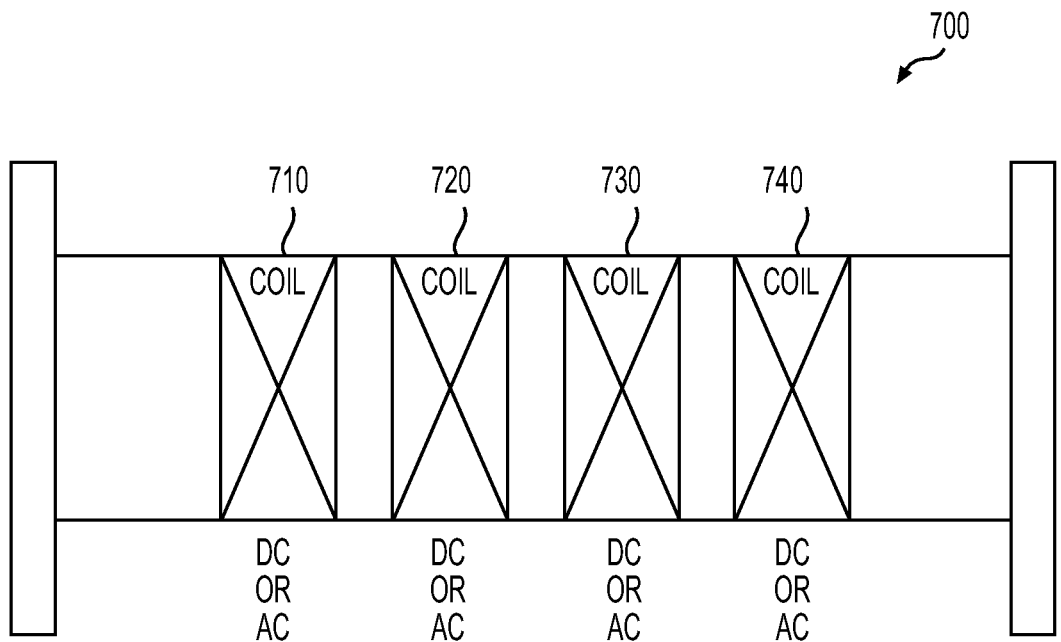
FIGS. 7A through 7D illustrate exemplary coil arrangements with four coils.
Figure 7B:
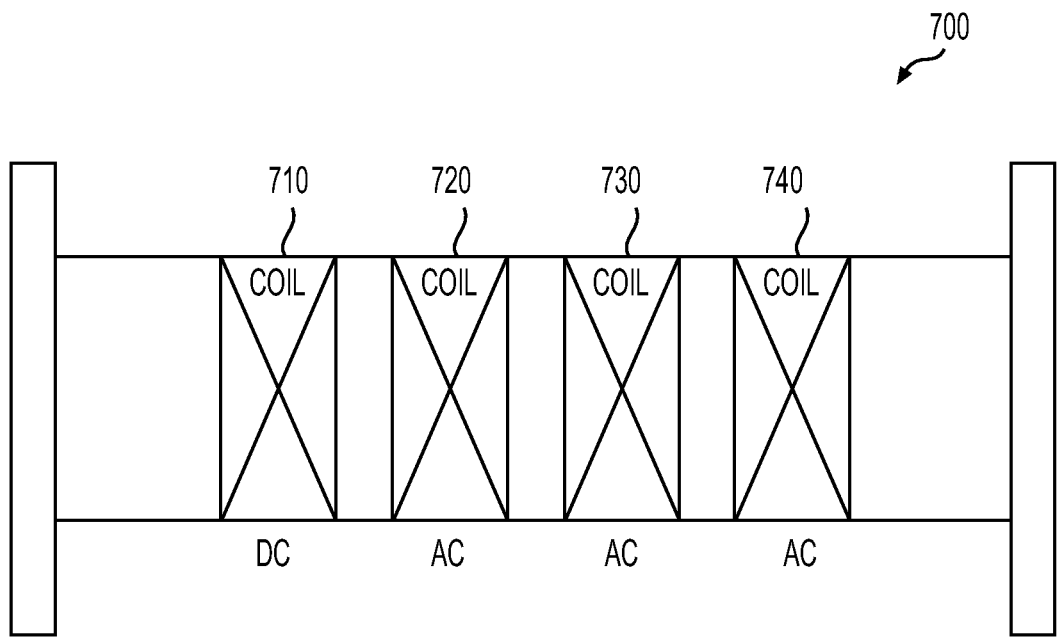
Figure 7C:
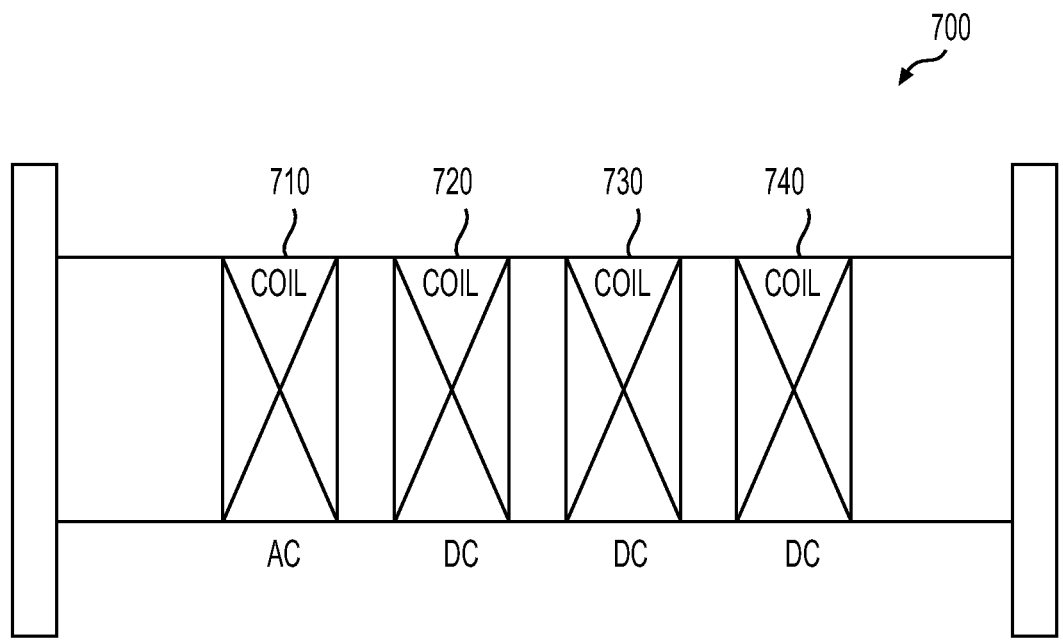
Figure 7D:
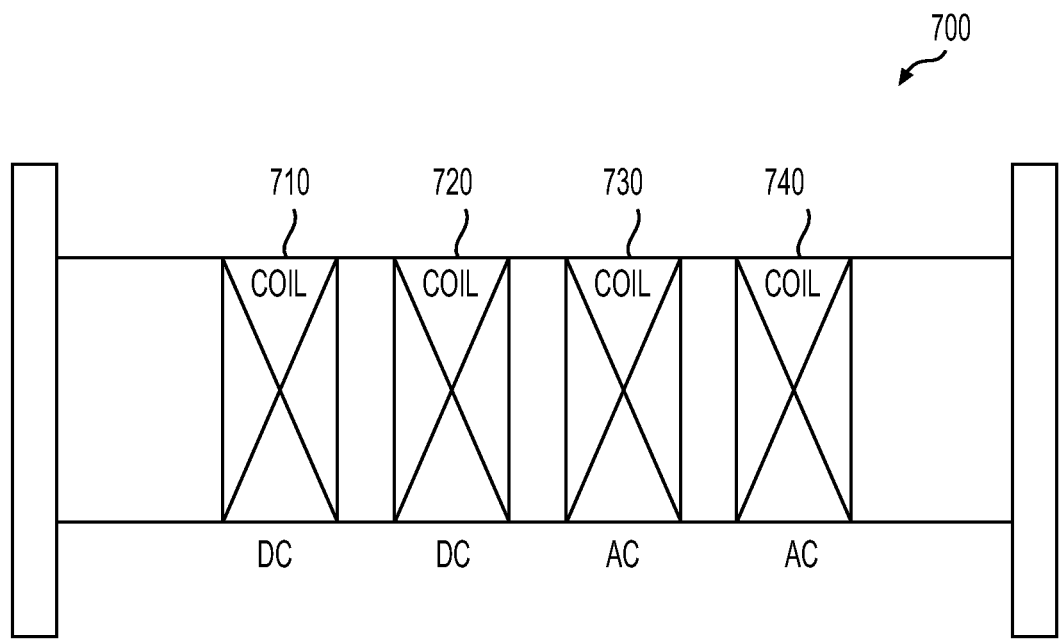

FIG. 5 is a flowchart illustrating an alternative Normal Run routine 300' of the exemplary method for automatically operating a high voltage AC resonance circuit. The routine 300' incorporates adjusting the frequency to match the new resonant frequency of the coil 170 if operation of the coil 170 has been affected due to age, temperature, water composition, etc. In this fashion, maximum power transfer can be maintained for much longer periods. This is accomplished by adjusting operational parameters using the HVSC 100 in real time. These parameters include the operating frequency, the expected power level from the HVSC 100, etc.

As shown in FIG. 5, in block 305 the microprocessor 150 sends a signal to the driver processor (not shown) of the coil drive circuit 160 to generate a fixed frequency as determined during the Scanning routine 200. The output power of the A/D converter 140 is monitored by the HVSC 100, and if detected to drop below a threshold value (also referred to as AC threshold (block 310), an error event is declared, block 315, which is communicated to a human operator (locally or remotely), terminating power, and recording the event, for example. If, in block 310, the output power of the A/D converter 140 exceeds the minimum threshold value, the routine 300' moves to block 320 and the microprocessor 150 determines if the power output of the A/D converter 140 has decreased by greater than 2 percent over its prior recorded value. If the decrease is greater than 2 percent, the routine 300' moves to block 325 and the microprocessor 150 adjusts the resonant frequency to match the power output of the A/D converter 140. Next, in blocks 330 and 335, the microprocessor 150 determines if the power output threshold for the A/D converter 140 should be adjusted via new input parameters from a user or other source, and if so, makes the adjustment.

FIG. 6 illustrates a configuration of a system 600 incorporating the SBC.

As noted above, each of the coils can be either an AC coil or a DC coil. FIG. 7 illustrates an exemplary coil arrangement of four coils. The four coils are independent and are wrapped on a spool piece. Each coil may have its own set of two wires that go through a umbilical cable to the drivers 163, 165 of the driver circuit 160 shown in FIG. 1. The drivers 163, 165 may treat each coil as in independent entity. Four coils are shown and described for illustration purposes only. One skilled in the art will readily appreciate that more or less coils can be equally applied in different sequences.

The coils may be spaced from approximately ¾ to 1¼ inches apart, for example, or even a single coil configuration can be used for either AC or DC signals as required by the specific application.

An embodiment of the system adjusts the firing sequences through the coils. An exemplary firing sequence for four coils can be, for example, DC-DC-AC-AC (i.e., alternating AC and DC at a lower rate) or AC-DC-AC-DC (i.e., alternating AC and DC at a higher rate). Various other firing sequences may be used.

The software 151 associated with the microprocessor may automatically determine whether a coil is an AC coil or a DC coil by detecting whether a capacitor 167 or a shunt is placed across the circuit board of the driver circuit 160.

If a capacitor 167 is detected across the circuit board of the driver circuit 160, the software 151 determines that the coil is an AC coil, and follows the automatic tuning process described above to determine the proper amplitude and frequency of AC pulses to obtain the maximum output. The software 151 automatically adjusts the amplitude and frequency of the AC pulses. In other words, the software not only automatically tunes to find the initial peak resonant amplitude and frequency of the AC pulses, but also continues to make adjustments over time. For example, if the software 151 finds that the voltage drops significantly, the software will re-tune the AC frequency.

If a shunt or jumper is detected across the circuit board of the driver circuit 160, the software 151 determines that the coil is a DC coil instead of a AC coil. The software 151 then follows different pathways to determine the amplitude and frequency of DC pulses. For a DC coil, the adjustment is turning the current on or off. DC pulses may be more effective than AC pulses to remove particle charges from small particulates floating in the waste water. However, the DC pulses may need to be fine tuned to generate the best results.

In short, the software 151 automatically determines if a coil is an AC coil or a DC coil and automatically performs amplitude and frequency adjustment of both the AC coil and the DC coil. While four coils are described as operating together, one skilled in art will readily appreciate that only one or two coils may operate at a given time. Four coils operate at the same time may be more efficient because there are four times as much surface area on the inside of the pipe to protect the electrical field.

The software 151 associated with the microprocessor performs two routines: a main routine that begins execution upon power-up of the microprocessor 150 and an interrupt routine that is setup at the beginning of the main routine during the process where timers are initialized.

Figure 8:
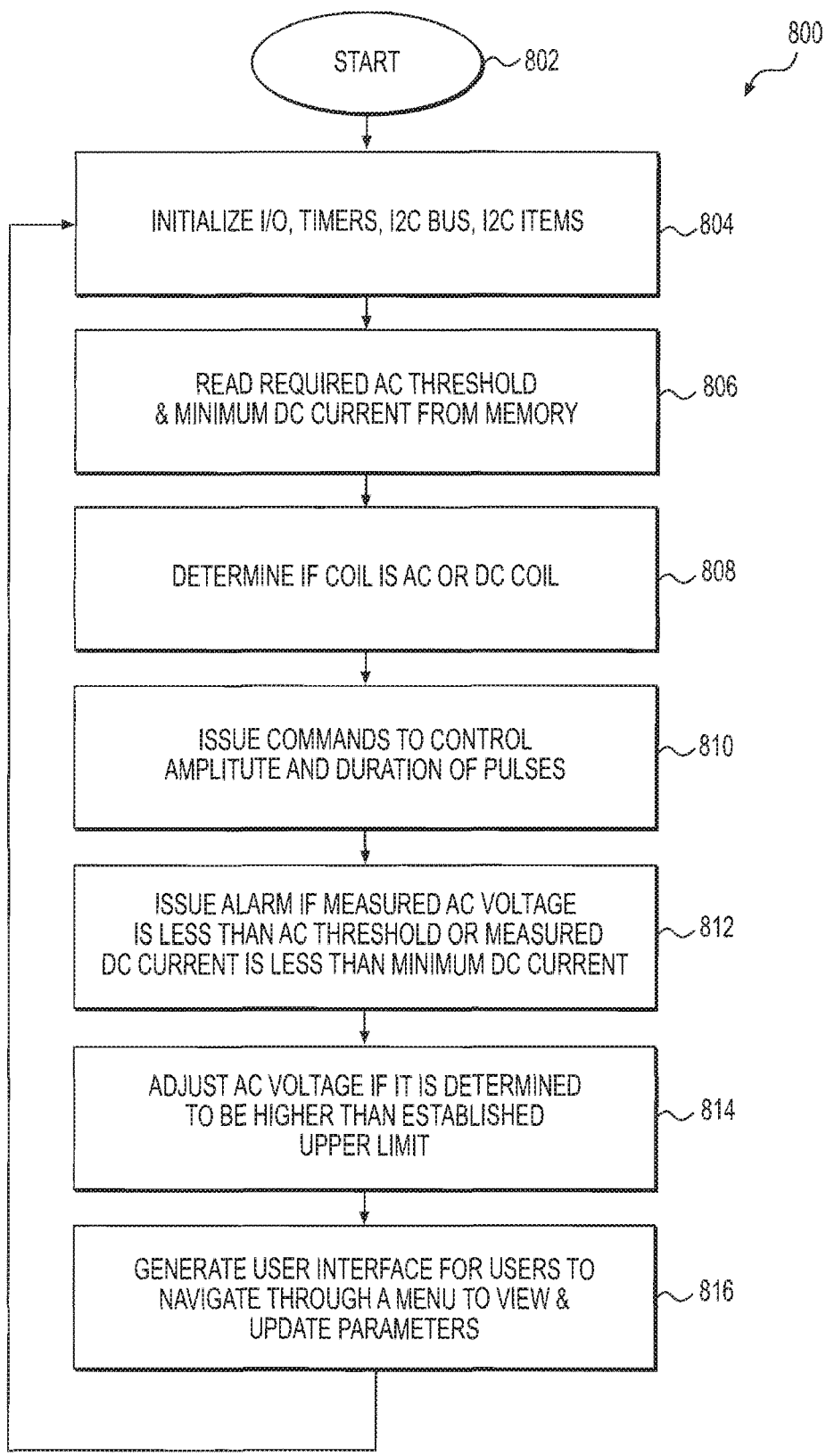
FIG. 8 illustrates an exemplary main routine of the exemplary method for automatically operating a high voltage resonance circuit and coils wired for DC current.

FIG. 8 illustrates an exemplary main routine 800 of the exemplary method for automatically operating a high voltage resonance circuit performed by the microprocessor 150. The main routine 800 starts (block 802) by initializing input/output (I/O) devices, timers, inter-integrated circuit (I2C) bus and other I2C items (block 804). The main routine 800 then reads the required AC threshold value from the memory 153, such as an electrically erasable programmable read-only memory (block 806). For each coil, the main routine 800 determines if the coil is an AC coil (with a capacitor in series with the coil) or a DC coil (with a jumper wire in place of the capacitor) (block 808). If the software 151 detects a capacitor, the resonant frequency is determined for the coil according to the routine described with respect to FIG. 3.

The main routine 800 issues commands to the driver processor of each coil to control the amplitude and frequency of pulses of the coil (block 810). The driver processor of each coil controls H-Bridge hardware to generate high voltage AC through the coil if a capacitor is detected, and to drive DC current through the coil if no capacitor is detected. An H-Bridge is the configuration of power electronic switches, such as metal oxide semiconductor field effect transistor (MOSFET), so that the switches can pass current through a two-lead load in either direction. For example, the load may be a coil that has a capacitor placed in series with it. The H-Bridge allows the driver processor to apply AC current to the coil, short each lead of the coil to ground, or pass DC current through the coil in either direction if no capacitor is detected. Each driver processor also measures coil HV and current.

The main routine 800 also requests each driver processor to find inductor/capacitor tank circuit resonance, which is a fixed frequency at which power losses in the load inductance and series capacitor combination are closest to zero. The driver processor may reduce the AC voltage at an AC coil if the AC voltage is determined to be higher than an established upper limit of the AC voltage. Other details of AC coil adjustment are described with respect to FIGS. 4 and 5.

The main routine 800 may provide different adjustments for different combinations or firing sequences of AC/DC coils. Generally, if a coil is operating under a DC mode, the main routine 800 may monitor its current levels to ensure that the current reaches the peak current value determined by the microprocessor 150. If the minimum DC current of the DC coil is not detected before an adjustable time limit, such as 12 ms, the main routine 800 may issue an alarm for this coil. All other coils continue to operate. If a coil is operating under an AC mode, the main routine 800 may monitor the high voltage generated at the AC coil to ensure that it exceeds the AC threshold determined by the microprocessor 150 (as described in FIG. 3). If the voltage generated at the AC coil does not exceed the AC threshold, the main routine 800 may issue an alarm for this coil. All other oils continue to operate with an attempt to re-tune the AC coil every minute, for example, to attempt to regain resonance on that AC coil. Re-tuning the coil can occur on a more or less frequent basis, such as 30 seconds.

For example, if no AC coil is detected and four DC coils are detected, the main routine 800 may request a minimum DC current from the memory 153, determine if the measured DC current meets the minimum DC current, and set an alarm if the measured DC current does not meet the minimum DC current (block 812).

If, for example, one AC coil is detected and three DC coils are detected, the main routine 800 may first request the AC threshold from the memory 153, determine if the measured AC voltage is less than the AC threshold, and set an alarm if the measured AC voltage is less than the AC threshold (block 812). Next, the main routine 800 may request a minimum DC current from the memory 153, determine if the measured DC current exceeds the minimum DC current, and set an alarm if the measured DC current does not exceed the minimum DC current (block 812).

If, for example, two AC coils are detected and two DC coils are detected, the main routine 800 may request the driver processor to issue two sequential AC bursts of different AC coils, followed by two DC pulses with delays between pulses only. The main routine 800 may follow the same procedures as described above in issuing alarms (block 812).

If, for example, three AC coils are detected and one DC coil is detected, the main routine 800 may request the driver processor to issue two sequential AC bursts of different AC coils, followed by two DC pulses with delays between pulses only. The main routine 800 may request the driver processor to excite the AC and DC coils in a predetermined or programmable sequence. The main routine 800 may follow the same procedures as described above in issuing alarms (block 812).

If, for example, four AC coils are detected and no DC coil is detected, the main routine 800 may request the driver processor to sequentially issue one AC burst for each of the four AC coils. The main routine 800 may follow the same procedures as described above in issuing alarms (block 812).

In addition to finding the resonant frequency, the main routine 800 also adjusts down an AC voltage at a coil if the AC voltage is determined to be higher than an established upper programmable limit to limit power delivery (block 814).

The AC bursts of an AC coil generally last for a fully programmable time period that is longer in duration than a single DC pulse of a DC coil. DC pulses may run consecutively, and the DC coils can be over-driven and overheat. At the same time, if DC pulses are spaced too far apart, the DC coils can be under-driven and efficacy can be compromised. In many configurations, a unique combination of AC and DC signals are present together with an optimal cycle time for power transfer and heat generation. The millisecond range cycle time of this optimal combination is imitated when more coils are configured for DC, thus sustaining optimal power transfer and efficacy levels. For example, if the application of DC is most effective at Tms per pulse every Nms with N>>T and N=AC burst sequence time, then DC pulses may remain Nms apart when AC coils are not present to sustain optimal water treatment efficacy.

Referring back to FIG. 8, the main routine 800 also generates a user interface for a user to navigate through a menu to view and update parameters (block 816). The main routine 800 searches for keystroke information (entered by a user) from an interrupt routine (described later with respect to FIG. 9). The main routine 800 also passes display updates to the interrupt routine. A user may read parameters and memory values using a menu displayed on a display screen. The user may also make operating parameter modifications using a more secure menu.

Figure 9:
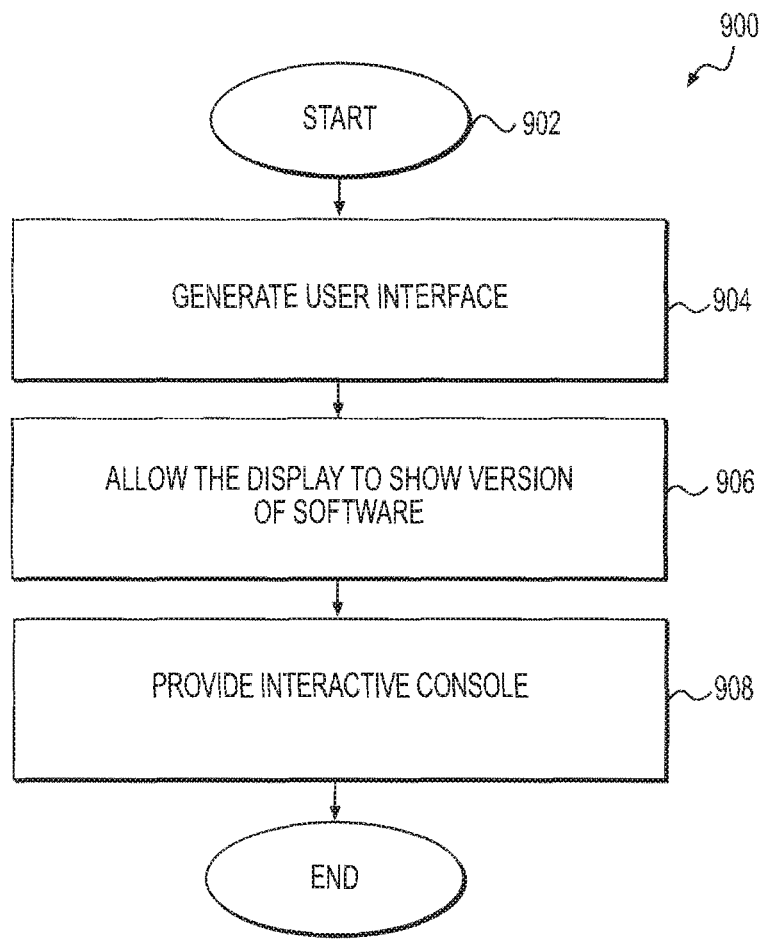
FIG. 9 illustrates an exemplary interrupt routine of the exemplary method for automatically operating a high voltage resonance circuit and DC control circuit.

The main routine 800 may return to block 806 and repeat the process,

FIG. 9 illustrates an exemplary interrupt routine 900 of the exemplary method for automatically operating a high voltage resonance circuit performed by the microprocessor 150. The interrupt routine 900 is generated by a time, and executed approximately every 1 ms to 10 ms, for example. The interrupt routine 900 starts (block 902) by generating a user interface (block 904) to allow the display screen to show the version of the software used (block 906), for example, and to provide an interactive console (block 908) for a user to use the keypads to observe the parameter values stored in the memory 153 and to adjust operating parameters. The interrupt routine 900 may execute every 1 ms, for example, according to the timer initialized by the main routine in block 804. The interrupt routine 900 may be divided into 10 pieces, for example, which may execute sequentially per interrupt. A multiplexer may be used to drive the display screen and read the keypad input. After 10 ms, each piece of the interrupt routine 900 may be executed. Each interrupt may also generate a time click, which is counted to generate run time seconds, minutes, and hours, for storage into the memory 153.

Each of the 10 pieces of code executed during the interrupt routine 900 may control one 7-segment character of the 6-digit display (six of the 10 pieces of code), or may read the four push-buttons that make up the keypad (for at least the last three pieces of code).

The interrupt routine 900 may receive the menu position information transmitted from the main routine 800 and decode push-button data into useable values to be sent back to the main routine 800. Various modifications to the exemplary interrupt routine are possible.

An embodiment of the system uses one or more sensors (such as the sensor 180 shown in FIG. 1) to measure the quality of the water and provide immediate feedback to the software 151 to adjust the amplitude and frequency of the DC pulses and/or AC pulses continually to arrive at the optimal spot.

Different types of sensors can be used to measure the quality of the water and provide immediate feedback to the system. For example, turbidity sensors or hydrocarbon sensors may be used. These sensors may provide a reading once a minute or once every 20-30 minutes. For example, these sensors can be an organic pollution monitor (also referred to as an ultraviolet (UV) monitor) that monitors organic pollution in water based on UV absorption performance of organics dissolved in water or other sample solutions. The organic pollution monitor may include a corrosion-resistant, stainless steel probe that features two windows separated by a gap of, for example, a 2 mm path length. The UV light projected across the gap may be detected by a photometer. A controller calculates the light absorbed by organics in the sample stream to provide an indication of the amount of natural organic matter (NOM) in water and wastewater. Results may be read directly off an alphanumeric or graphical display.

For electronic control purposes, if the sensors show too much of a condition (organic pollution), then the control output can be increased or decreased a pre-programmed amount, per the application of power and signal type. After some time for stabilization, the microprocessor 150 may monitor the result, extrapolate for a target reading, and adjust the output power and signal level according to that extrapolation. Again, after some time for settling, the sensors may be read again and a new extrapolated result may be used to adjust the outputs again. This may be an iterative process largely determined in scope and speed by the settling delays and the effects of the signal being controlled. It may appear as a real-time closed-loop system with small adjustments or as a delayed, target and re-target system, where adjustments are larger and progressively fine-tune.

Alternatively, a manual operator may adjust the amplitude and frequency of the DC pulses and/or AC pulses. After the system operates at those modified parameters, and if the manual operator is still dissatisfied, the manual operator may make additional manual adjustments.

After receiving the feedback from the sensor, the software 151 may adjust the coils simultaneously. Alternatively, the software 151 may adjust the coils one at a time.

Figure 10:
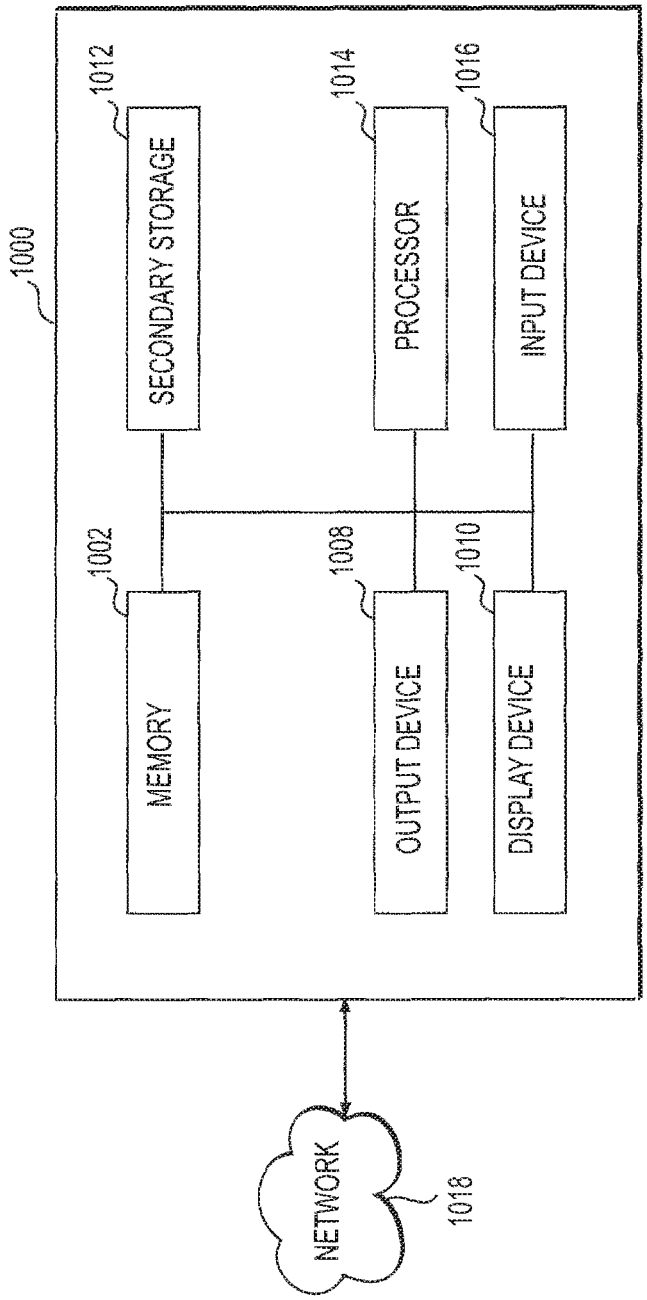
FIG. 10 is a block diagram illustrating exemplary hardware components for implementing embodiments of system and method for automatically operating a high voltage resonance circuit that can also contain DC control for coils configured for DC operation.
Figure 12:
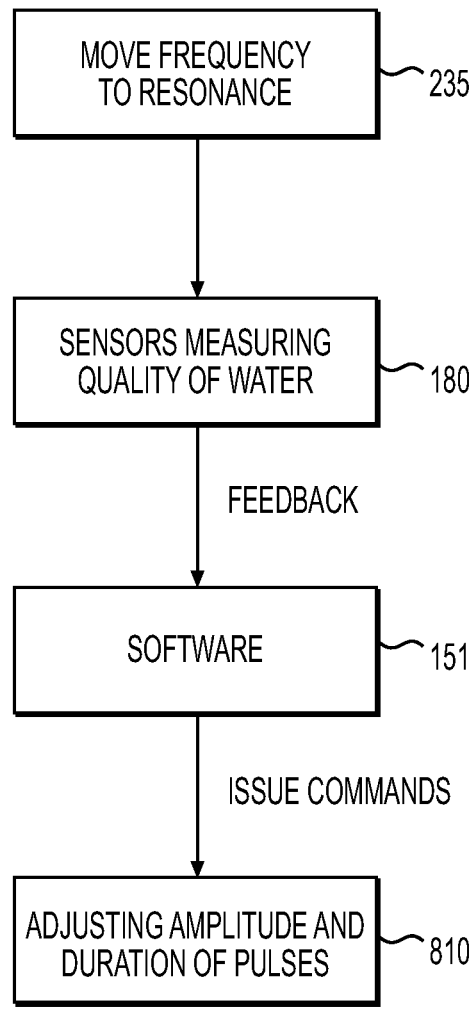
FIG. 12 illustrates an example of self-tuning.

With reference now to FIG. 10, shown is a block diagram illustrating exemplary hardware components for implementing embodiments of system and method for automatically operating a high voltage resonance circuit. Server 1000, or other computer system similarly configured, may include and execute software to perform functions described herein, including steps of methods described above. Likewise, a mobile device which includes some of the same components of computer system 1000 may perform steps of methods described above. Computer system 1000 may connect with network 1018, e.g., Internet, or other network, to receive inquires, obtain data, and transmit information and incentives as described above. In addition to uploading or downloading data, the system may be configured to be controlled remotely or monitored remotely. In this way, changes can be made to the system settings from a remote location. In a system where a user is remote to the sensors and output, telecommunications may be used by the system to send information such as operating conditions and sensor outputs to the user. The user may then adjust operating parameters (such as new levels of AC signals and new levels of DC signals, as well as new AC and DC timing values), which may then be used to update the values in the software that the software uses to generate the signals. The remote user may also be able to request an update to see how the new signals are affecting the system and how the sensors are responding.

Computer system 1000 typically includes a memory 1002 (which may be memory 153), a secondary storage device 1012, and a processor 1014 (which may be the microprocessor 150 or the driver processor). Server 1000 may also include a plurality of processors 1014 and be configured as a plurality of, e.g., bladed servers, or other known server configurations. Server 1000 may also include an input device 1016, a display device 1010, and an output device 1008. Memory 1002 may include RAM or similar types of memory and it may store one or more applications for execution by processor 1014. Secondary storage device 1012 may include a hard disk drive, floppy disk drive, CD-ROM drive, or other types of non-volatile data storage. Processor 1014 executes the application(s), such as the routines described above, which are stored in memory 1002 or secondary storage 1012, or received from the Internet or other network 1018. The processing by processor 1014 may be implemented in software, such as software modules, for execution by computers or other machines. These applications preferably include instructions executable to perform the functions and methods described above and illustrated in the Figures herein. The applications preferably provide GUIs through which users may view and interact with the application(s), such as the routines described above.

In addition, as noted, processor 1014 may execute one or more software applications in order to provide the functions described in this specification, specifically to execute and perform the steps and functions in the methods described above. Such methods and the processing may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the system.

Input device 1016 may include any device for entering information into computer system 1000, such as a touch-screen, keyboard, mouse, cursor-control device, microphone, digital camera, video recorder or camcorder. The input device 1016 may be used to enter information into GUIs during performance of the methods described above. Display device 1010 may include any type of device for presenting visual information such as, for example, a computer monitor or flat-screen display (or mobile device screen). The display device 1010 may display the GUIs and/or output from the routines described above. Output device 1008 may include any type of device for presenting a hard copy of information, such as a printer, and other types of output devices include speakers or any device for providing information in audio form.

Examples of computer system 1000 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 1010 is shown in detail, the system for automatically operating a high voltage resonance circuit may use multiple computer systems or servers as necessary or desired to support the users and may also use back-up or redundant servers to prevent network downtime in the event of a failure of a particular server. In addition, although computer system 1000 is depicted with various components, one skilled in the art will appreciate that the server can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling a computer system, computer system 1000, to perform a particular method, such as methods described above.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

I claim:

1. An electrical water treatment system with a self-adjusting high voltage sensor circuit, the electrical water treatment system comprising:
    four or more coils, wherein each of the coils is an AC or DC coil and there is at least one DC coil and at least on AC coil;
    a memory wherein an AC threshold value and a minimum DC current is stored;
    sensors that measure quality of water;
    means for checking whether the AC threshold value is met;
    means for checking whether the minimum DC current value is met;
    means for firing the coils in a sequence, wherein the firing sequence comprises at least one of DC-DC-AC-AC and AC-DC-AC-DC, and wherein length of time for a pulse of one of the AC coils is greater than a time of a DC coil pulse; and
    means for self-tuning, using the measured quality of water from the sensors, one or more of the AC coils by adjusting amplitude and frequency of the pulses of the one or more AC coils, wherein a resonant condition is maintained.

2. The electrical water treatment system of claim 1 wherein the firing sequence is programmable.

3. The electrical water treatment system of claim 1 further comprising means for self-tuning, using the measured quality of water from the sensors, one or more of the DC coils.

* * * * *